United States Patent
Nishio

(10) Patent No.: US 9,053,303 B2
(45) Date of Patent: Jun. 9, 2015

(54) APPARATUS, AUTHENTICATION SYSTEM, AUTHENTICATION CONTROL METHOD, AUTHENTICATION CONTROL PROGRAM, AND COMPUTER-READABLE RECORDING MEDIUM HAVING AUTHENTICATION CONTROL PROGRAM

(75) Inventor: Satoru Nishio, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 302 days.

(21) Appl. No.: 12/776,622

(22) Filed: May 10, 2010

(65) Prior Publication Data

US 2010/0306829 A1 Dec. 2, 2010

(30) Foreign Application Priority Data

May 26, 2009 (JP) ................................ 2009-126867

(51) Int. Cl.
*G06F 7/04* (2006.01)
*G06F 15/16* (2006.01)
(Continued)

(52) U.S. Cl.
CPC ................ *G06F 21/31* (2013.01); *G06F 21/44* (2013.01); *H04W 12/04* (2013.01); *G06F 21/34* (2013.01); *H04W 12/00* (2013.01); *G06F 21/608* (2013.01)

(58) Field of Classification Search
CPC ......... G06F 21/31; G06F 21/34; G06F 21/44; H04W 12/00; H04W 12/04
USPC ......................... 726/2–7, 16–19, 27; 713/168
See application file for complete search history.

(56) References Cited

U.S. PATENT DOCUMENTS 5,689,638 A * 11/1997 Sadovsky ........................ 726/21
7,194,761 B1 * 3/2007 Champagne ...................... 726/6
(Continued)

FOREIGN PATENT DOCUMENTS

| JP | 2005-284452 A | 10/2005 |
|----|---------------|---------|
| JP | 2008-26932 A  | 2/2008  |

(Continued)

OTHER PUBLICATIONS

Extended European Search Report issued Oct. 7, 2010, in Patent Application No. 10163190.1.
(Continued)

*Primary Examiner* — Jeffrey Pwu
*Assistant Examiner* — Jayesh Jhaveri
(74) *Attorney, Agent, or Firm* — Oblon, McClelland, Maier & Neustadt, L.L.P.

(57) ABSTRACT

A disclosed image forming apparatus includes an authentication information reception unit configured to receive first authentication information input to the image forming apparatus, an authentication control unit configured to send the first authentication information to a first authentication apparatus connected to the image forming apparatus via a network and cause the first authentication apparatus to carry out a first authentication based on the first authentication information, and an authentication information recording unit configured to record, when the first authentication based on the first authentication information has succeeded, the first authentication information therein as second authentication information. In the image forming apparatus, the authentication control unit carries out, in a case where the first authentication apparatus is not available, a second authentication based on the second authentication information recorded in the authentication information recording unit in lieu of the first authentication based on the first authentication information.

14 Claims, 9 Drawing Sheets

(51) Int. Cl.
*G06F 17/30* (2006.01)
*H04L 29/06* (2006.01)
*G06F 21/31* (2013.01)
*G06F 21/60* (2013.01)
G06F 21/44 (2013.01)
H04W 12/04 (2009.01)
G06F 21/34 (2013.01)
H04W 12/00 (2009.01)

(56) References Cited

U.S. PATENT DOCUMENTS

| | | | |
|---|---|---|---|
| 7,565,547 B2 * | 7/2009 | Matta et al. | 713/182 |
| 7,656,547 B2 * | 2/2010 | Kuo et al. | 358/1.15 |
| 7,689,824 B2 * | 3/2010 | Imaizumi et al. | 713/169 |
| 7,730,523 B1 * | 6/2010 | Masurkar | 726/4 |
| 8,056,116 B2 * | 11/2011 | Katoh et al. | 726/2 |
| 2003/0093690 A1 | 5/2003 | Kemper | |
| 2004/0122961 A1 * | 6/2004 | Rouault | 709/229 |
| 2004/0193921 A1 * | 9/2004 | Byrne | 713/201 |
| 2005/0091490 A1 * | 4/2005 | Ogura | 713/165 |
| 2005/0154915 A1 * | 7/2005 | Peterson et al. | 713/201 |
| 2005/0246767 A1 * | 11/2005 | Fazal et al. | 726/11 |
| 2006/0028996 A1 * | 2/2006 | Huegen et al. | 370/252 |
| 2006/0048234 A1 * | 3/2006 | Imaizumi et al. | 726/27 |
| 2006/0064753 A1 * | 3/2006 | Otake et al. | 726/19 |
| 2006/0104656 A1 * | 5/2006 | Tomita et al. | 399/80 |
| 2006/0136992 A1 * | 6/2006 | Shigeeda | 726/2 |
| 2006/0155721 A1 * | 7/2006 | Grunwald et al. | 707/100 |
| 2007/0005954 A1 * | 1/2007 | Skemer | 713/153 |
| 2007/0106893 A1 * | 5/2007 | Deishi | 713/168 |
| 2007/0107042 A1 * | 5/2007 | Corona | 726/2 |
| 2007/0233957 A1 * | 10/2007 | Lev-Ran et al. | 711/118 |
| 2008/0068643 A1 * | 3/2008 | Yasunaga | 358/1.15 |
| 2008/0077972 A1 * | 3/2008 | Chou et al. | 726/2 |
| 2008/0168545 A1 | 7/2008 | Inoue et al. | |
| 2008/0231887 A1 * | 9/2008 | Sakagami et al. | 358/1.15 |
| 2008/0244708 A1 * | 10/2008 | Wilkie et al. | 726/4 |
| 2008/0252922 A1 * | 10/2008 | Ikegami et al. | 358/1.15 |
| 2008/0256459 A1 * | 10/2008 | Sekiya | 715/741 |
| 2008/0304660 A1 * | 12/2008 | Sawayanagi et al. | 380/44 |
| 2009/0024751 A1 * | 1/2009 | Taniguchi et al. | 709/229 |
| 2009/0070855 A1 | 3/2009 | Hori et al. | |
| 2009/0070868 A1 | 3/2009 | Ohtaka et al. | |
| 2009/0222914 A1 * | 9/2009 | Ozawa | 726/21 |
| 2009/0235341 A1 * | 9/2009 | Hashimoto | 726/5 |
| 2009/0328159 A1 * | 12/2009 | Luo | 726/4 |
| 2010/0031346 A1 * | 2/2010 | Kano | 726/19 |
| 2010/0115597 A1 * | 5/2010 | Murakawa | 726/7 |
| 2011/0138482 A1 * | 6/2011 | Kishimoto | 726/28 |

FOREIGN PATENT DOCUMENTS

JP 2009-69992 4/2009
JP 2009-71409 4/2009

OTHER PUBLICATIONS

Office Action issued Jun. 18, 2013, in Japanese Patent Application No. 2009-126867.

* cited by examiner

FIG.5

| USER NAME | PASSWORD | CARD ID | MAIL ADDRESS | AUTHORIZATION INFORMATION | |
|---|---|---|---|---|---|
| AAA | ... | ... | ... | ... | ... |
| BBB | ... | ... | ... | ... | ... |
| CCC | ... | ... | ... | ... | ... |
| DDD | ... | ... | ... | ... | ... |
| .. | .. | .. | .. | .. | .. |

| USER NAME | PASSWORD | CARD ID | MAIL ADDRESS | AUTHORIZATION INFORMATION | ... |
|---|---|---|---|---|---|
| AAA | ... | ... | ... | ... | ... |
| | | | | | |
| | | | | | |

125

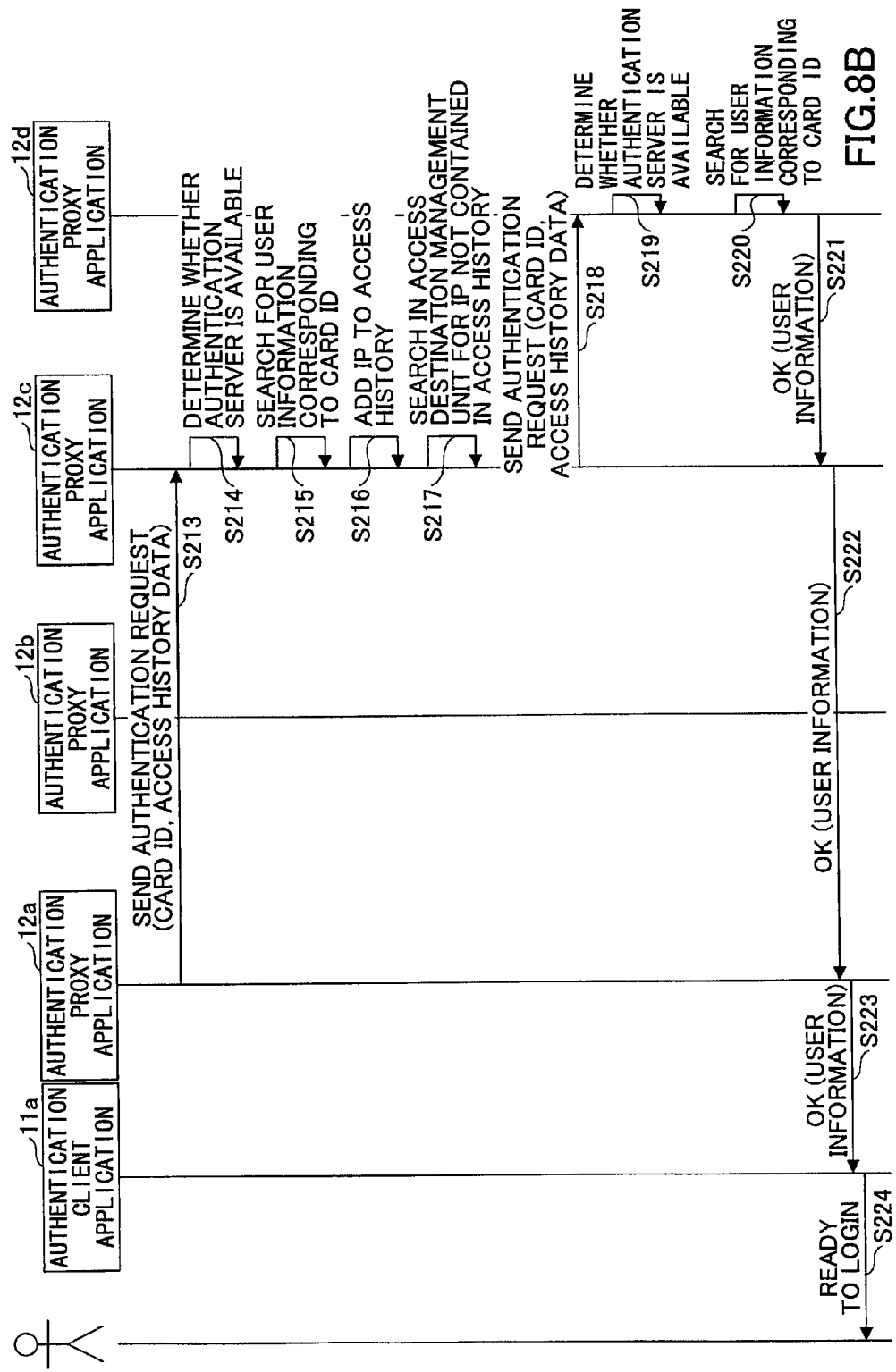

APPARATUS, AUTHENTICATION SYSTEM, AUTHENTICATION CONTROL METHOD, AUTHENTICATION CONTROL PROGRAM, AND COMPUTER-READABLE RECORDING MEDIUM HAVING AUTHENTICATION CONTROL PROGRAM

BACKGROUND OF THE INVENTION

1. Field of the Invention

The invention generally relates to an image forming apparatus, an authentication system, an authentication control method, an authentication control program, and a computer-readable recording medium having such an authentication control program embodied therein, and particularly relates to an image forming apparatus, an authentication system, an authentication control method, an authentication control program, and a computer-readable recording medium having such an authentication control program capable of carrying out authentication of users.

2. Description of the Related Art

Many offices use shared image forming apparatuses having authentication functions to authenticate users so that the image forming apparatuses are only used by authenticated users. Further, these image forming apparatuses include authentication functions and access control functions, and the combination of such functions can control users' accessibilities to different functions of the image forming apparatuses.

It is desirable to prepare a database for managing authentication information of users (hereinafter called a "user DB") for the image forming apparatuses in order to fully perform the authentication function. Some offices may have several image forming apparatuses. On the corporate scale basis, some companies have several thousand to several tens of thousands of image forming apparatuses. If the user DB is distributed to such numerous image forming apparatuses, not only may user DB maintenance activity per se become cumbersome, but the usability of resources (e.g., HDD (Hard Disk Drive)) in the image forming apparatuses may be degraded.

Japanese Patent Application Publication No. 2009-071409, for example, discloses the image forming apparatus in which the authentication functions and the user DBs for the image forming apparatuses in the office are provided in an external computer (i.e., authentication server). In the image forming apparatuses having this configuration, the authentication information of a user input via an operations panel is transferred to the authentication server via a network. The authentication server then compares the transferred authentication information of the user with the information of the user stored in the user DB to authenticate the user. Thereafter, the authentication server sends a response including the authentication result to the image forming apparatus via the network. With the above system configuration, the user DB maintenance activity may be simplified and the usability of the resources in the image forming apparatus may be improved.

However, with such a system configuration (i.e., an authentication server is assigned to authenticate users), users may have difficulties in logging into the image forming apparatuses despite the fact that they are functioning properly if some kind of communication trouble occurs in the network between the image forming apparatus and the authentication server or if the authentication server itself is not working properly. As a result, the users may be unable to access the image forming apparatuses, which may further interrupt efficiency in their work duties. Notice that more communication problems may occur if the image forming apparatuses and the authentication server are connected via a wide area network (WAN) such as the Internet.

SUMMARY OF THE INVENTION

It is a general object of at least one embodiment of the present invention to provide an image forming apparatus, an authentication system, an authentication control method, an authentication control program, and a computer-readable recording medium having such an authentication control program embodied therein capable of appropriately carrying out authentication of users even if an authentication apparatus connected to the image forming apparatus via a network is not available.

According to one embodiment, an image forming apparatus includes an authentication information reception unit configured to receive first authentication information input to the image forming apparatus, an authentication control unit configured to send the first authentication information to a first authentication apparatus connected to the image forming apparatus via a network and cause the first authentication apparatus to carry out a first authentication based on the first authentication information, and an authentication information recording unit configured to record, when the first authentication based on the first authentication information has succeeded, the first authentication information therein as second authentication information. In the image forming apparatus, the authentication control unit carries out, in a case where the first authentication apparatus is not available, a second authentication based on the second authentication information recorded in the authentication information recording unit in lieu of the first authentication based on the first authentication information.

According to another embodiment, an authentication system includes an image forming apparatus and an authentication apparatus. In the authentication system, the image forming apparatus includes an authentication information reception unit configured to receive first authentication information input to the image forming apparatus, an authentication control unit configured to send the first authentication information to the authentication apparatus and cause the authentication apparatus to carry out a first authentication based on the first authentication information, and an authentication information recording unit configured to record, when the first authentication based on the first authentication information has succeeded, the first authentication information therein as second authentication information. In the image forming apparatus of the authentication system image forming apparatus, the authentication control unit carries out, in a case where the first authentication apparatus is not available, a second authentication based on the second authentication information recorded in the authentication information recording unit in lieu of the first authentication based on the first authentication information.

According to another embodiment, a computer-readable recording medium having a computer executable authentication control program embodied therein, the computer executable authentication control program having instructions which when executed by a computer processor, causes an image forming apparatus to implement a method including receiving first authentication information input to the image forming apparatus, sending the first authentication information to a first authentication apparatus connected to the image forming apparatus via a network and causing the first authentication apparatus to carry out a first authentication based on the first authentication information, recording, when the first authentication based on the first authentication information has succeeded, the first authentication information in an authentication information recording unit of the image forming apparatus as second authentication information. In the computer-readable recording medium, in a case where the first authentication apparatus is not available, the method includes carrying out a second authentication based on the second authentication information recorded in the authentication information recording unit in lieu of the first authentication based on the first authentication information.

Other objects and further features of embodiments will be apparent from the following detailed description when read in conjunction with the accompanying drawings.

BRIEF DESCRIPTION OF THE DRAWINGS

FIG. 5 is a diagram illustrating an example of a user information configuration in a user information management unit;

FIG. 6 is a diagram illustrating an example of a user information cache unit configuration;

FIGS. 8A and 8B are each another sequence diagram illustrating a procedure of authentication processing according to the second embodiment of the invention.

DESCRIPTION OF THE PREFERRED EMBODIMENTS

Figure 1:
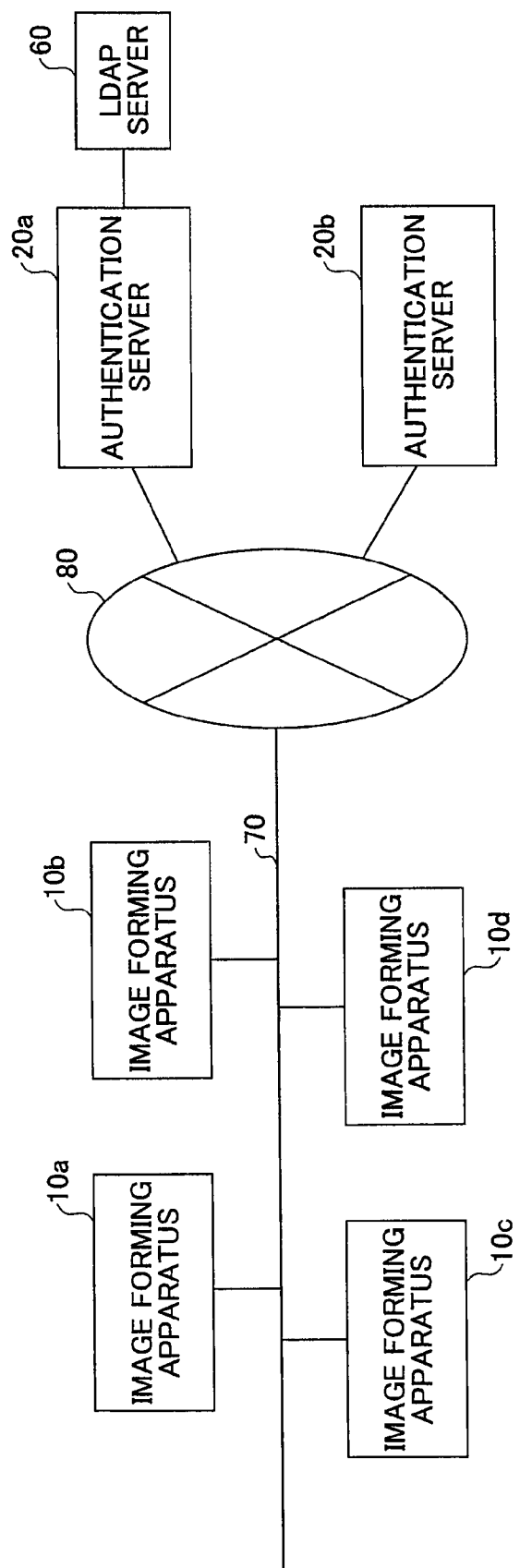
FIG. 1 is a diagram illustrating an example of a system configuration according to a first embodiment of the invention.

In the following, preferred embodiments of the present invention are described with reference to the accompanying drawings. FIG. 1 is a diagram illustrating an example of a system configuration according to a first embodiment of the invention.

As illustrated in FIG. 1, image forming apparatuses 10a through 10d (hereinafter, they are called an "image forming apparatus 10" as a whole when individual apparatuses are not discriminated) are connected to an intra-office network 70 (regardless of wired or wireless) such as a Local Area Network (i.e., LAN) to communicate through the intra-office network 70. The image forming apparatus 10 is connected to authentication servers 20a and 20b (hereinafter, called an "authentication server 20" as a whole when individual servers are not considered) via a wide area network 80. The image forming apparatus 10 may have a single function, such as a copier, a printer, a scanner, or a facsimile machine, or a combination of two or more functions.

The authentication server 20 is a computer that authenticates users of the image forming apparatus 10. Authentication types performed by the authentication server 20 are not particularly specified. For example, the authentication server 20a authenticates users using a lightweight directory access protocol (LDAP) server 60.

Figure 2:
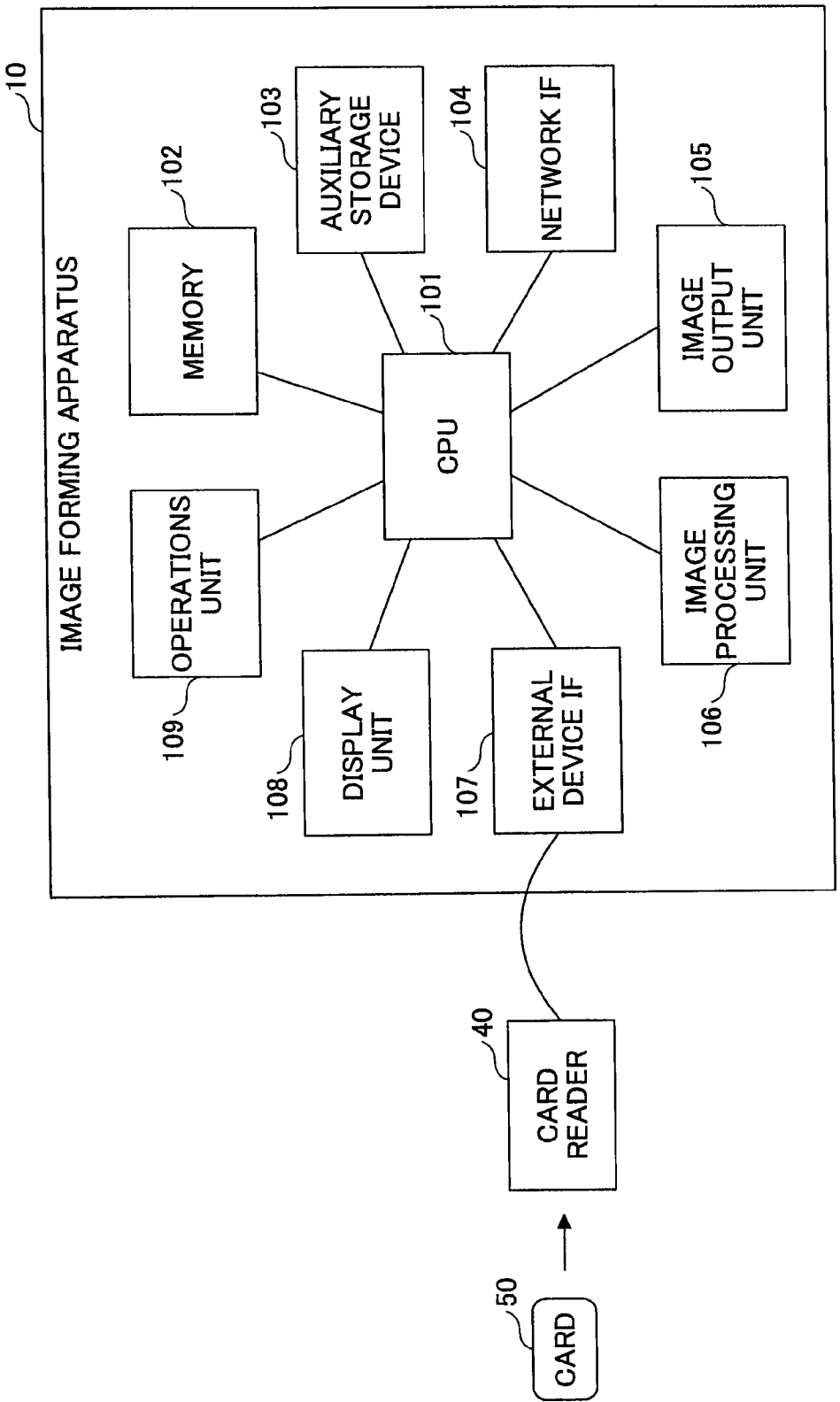
FIG. 2 is a diagram illustrating an example of a hardware configuration according to the first embodiment of the invention.

FIG. 2 is a diagram illustrating an example of a hardware configuration according to the first embodiment of the invention. As illustrated in FIG. 2, the image forming apparatus 10 includes a CPU 101, a memory 102, an auxiliary storage device 103, a network IF 104, an image output unit 105, an image processing unit 106, an external device IF 107, a display unit 108, and an operations unit 109.

A computer program that executes the functions of the image forming apparatus 10 is recorded and installed in the nonvolatile auxiliary storage device 103 such as a hard disk drive (HDD). The auxiliary storage device 103 stores requisite files and data, and the like, while storing the computer program. The memory 102 stores the computer program retrieved from the auxiliary storage device 103 when an instruction is generated to start up the computer program. The CPU 101 executes the computer program having instructions stored in the memory 102 to implement the functions of the image forming apparatus 10. The network IF 104 is configured to function as an interface for connecting the image forming apparatus 10 to the network.

The display unit 108 includes a liquid crystal display (LCD) on which an operations screen or a message can be displayed. The operations unit 109 includes hardware buttons (keys) via which users input desired data. Note that the display unit 108 and the operations unit 109 may be integrated as an operations panel.

The image processing unit 106 carries out various types of image processing required for outputting (e.g., printing) image data. The image outputting unit 105 carries out output of image data (e.g., printing).

The external device IF 107 is an interface that connects the image forming apparatus 10 and the card reader 40 via which authentication information is input, and may be composed of a USB port (USB host interface) or a serial port. The card reader 40 is configured to read information from the card 50 and includes a hardware interface that can be connected to the external device IF 107, such as a USB connector or a serial interface. Note that the card reader 40 may be provided inside the image forming apparatus 10. The card reader 40 may be either a contact type or a noncontact (contactless) type. The card 50 is not limited to an IC card, but may be any type of a card capable of recording a unique card ID (card number) such as a magnetic card. The card ID is generally called a "universal ID" or a "card serial number". Specific examples of the card include a proximity card, a Mifare card, and a Java (registered trademark) card.

In the following embodiments, it is assumed that the cards 50 are supplied to corresponding users. However, one of the cards 50 may be shared by several users based on the security level required for operations of the image forming apparatus. Note that the cards 50 supplied to the corresponding users are not limited to one type. As described above, the card reader 40 may simply be connected to the image forming apparatus 10 via the USB or the like. Thus, different card readers 40 corresponding to different types of cards 50 (e.g., proximity card, Mifare card, and Have (registered trademark)) may simultaneously be connected to the image forming apparatus 10. In this case, the different types of the cards 50 may be used simultaneously.

Figure 3:
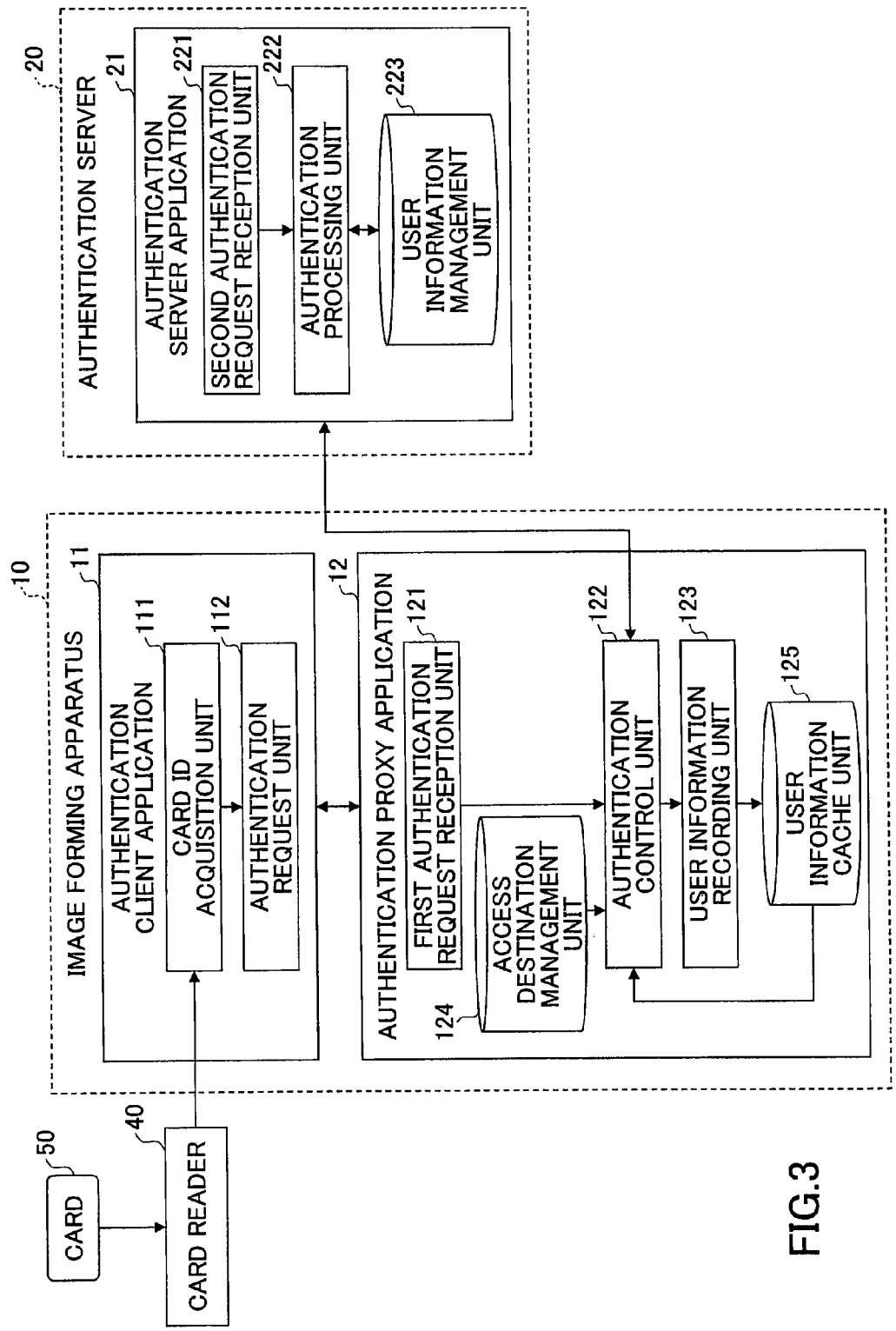
FIG. 3 is a diagram illustrating examples of functional configurations of an image forming apparatus and an authentication server according to the first embodiment of the invention.

FIG. 3 is a diagram illustrating an example of a functional configuration of the image forming apparatus and the authentication server according to the first embodiment of the invention.

As illustrated in FIG. 3, the image forming apparatus 10 includes an authentication client application 11 and an authentication proxy application 12. The authentication client application 11 is a computer program that prompts a user to input his or her card ID (authentication information). The authentication client application 11 causes the image forming apparatus 10 to function as a card ID acquisition unit 111 and an authentication request unit 112, and the like. The card ID acquisition unit 111 acquires a card ID via the card reader 40 that has read the card ID from the card 50. The authentication request unit 112 sends an authentication request including the card ID acquired from the card ID acquisition unit 111 to the authentication proxy application 12.

The authentication proxy application 12 includes a computer program that causes the authentication server 20 to execute authentication of a user based on the acquired card ID. The computer program included in the authentication proxy application 12 also causes the authentication proxy application 12 per se to execute authentication processing based on the card ID in a case where the authentication server 20 is not available or out of service. The authentication proxy application 12 causes the image forming apparatus 10 to function as a first authentication request reception unit 121 and an authentication control unit 122, a user information recording unit 123, and the like. The first authentication request reception unit 121 receives the authentication request sent from the authentication client application 11. The authentication control unit 122 transfers the received authentication request to the authentication server 20, which then executes authentication processing based on the card ID in the received authentication request. An access destination management unit 124 has identification information of the authentication server 20, which is a transferring destination of the received authentication request. Examples of such identification information of the authentication server 20 include an IP address, a host name, and a uniform resource locator (URL). The access destination management unit 124 indicates a storage region of the auxiliary storage device 103 in which the identification information of the authentication request transferring destination is stored. The user information recording unit 123 records on a user information cache unit 125 users' attribution information (user information) that is sent from the authentication server 20 when the authentication has succeeded. The user information cache unit 125 is a storage region of the auxiliary storage device 103 in which the user information is stored. Note that the authentication control unit 122 carries out authentication of the user based on the acquired card ID and the user information recorded in the user information cache unit 125 in a case where the authentication server 20 is not available or out of service.

The authentication server 20 includes a authentication server application 21. The authentication server application 21 includes a computer program that executes authentication processing based on the card ID. The authentication server application 21 causes the authentication server 21 to function as a second authentication request reception unit 221 and an authentication processing unit 222. The second authentication request reception unit 221 receives an authentication request transferred from the authentication proxy application 12. The authentication processing unit 222 carries out authentication of the user based on the card ID in the authentication request and the user information recorded in a user information management unit 223. The authentication processing unit 222 sends the authenticated user information to the authentication proxy application 12 if the authentication has succeeded. The user information management unit 223 indicates a storage region of the storage device of the authentication server 20 in which information on users of the image forming apparatus 10 has been recorded in advance.

Note that an interface of the first authentication request reception unit 121 of the authentication proxy application 12 may be the same as the interface of the second authentication request reception unit 221 of the authentication server application 21. Specifically, the first authentication request reception unit 121 may be configured to receive an authentication request based on the same message specification (message format) as a communication protocol such as HTTP or SOAP of the second authentication request reception unit 221. With such a configuration, the authentication proxy application 12 can be embedded, without changing the source code of the authentication client application 11, in an environment in which the authentication client application 11 is configured to directly send an authentication request to the authentication server application 21.

Figure 4:
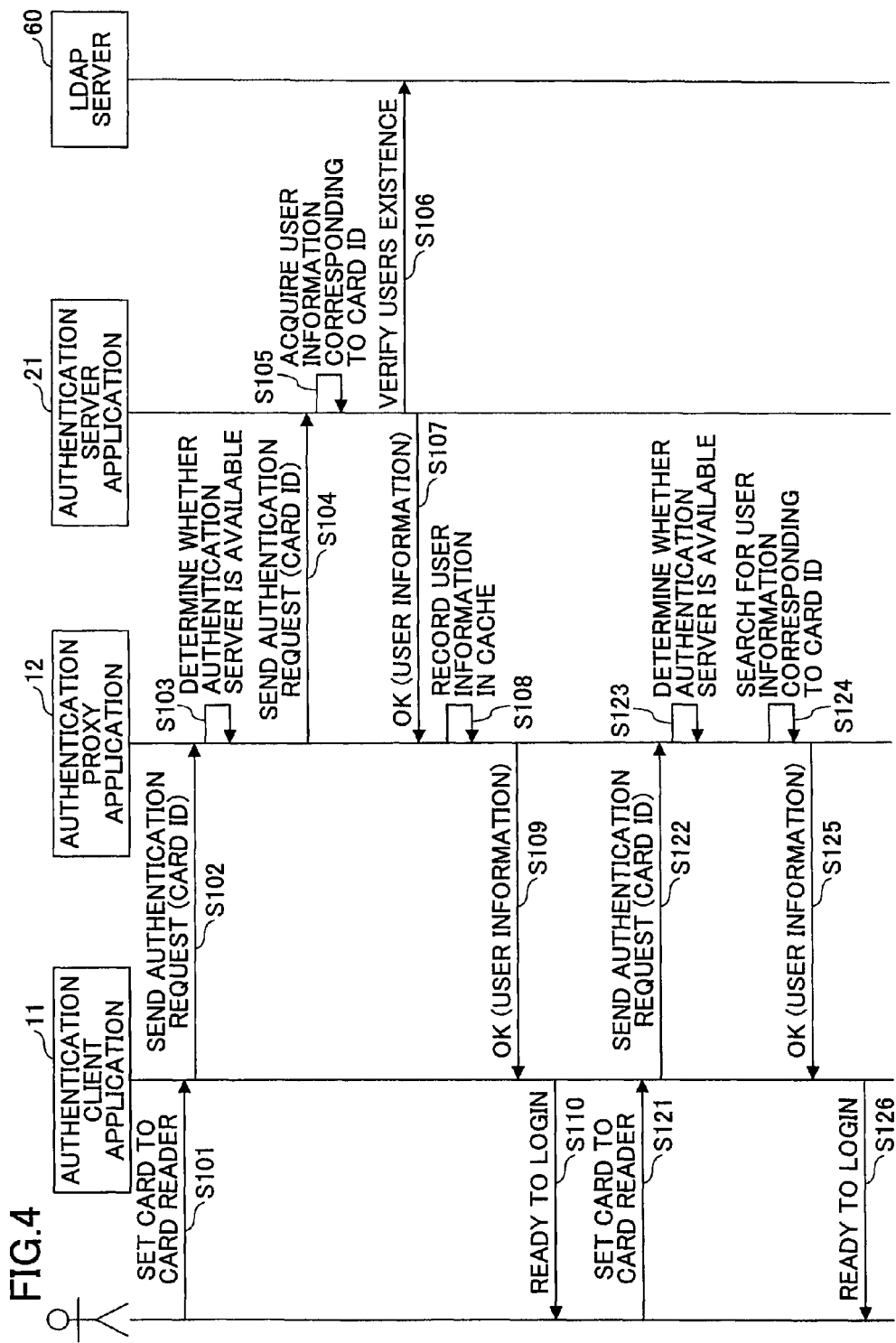
FIG. 4 is a sequence diagram illustrating a procedure of authentication processing according to the first embodiment of the invention.

Next, procedures carried out by the image forming apparatus 10 and the authentication server 20 are described below. FIG. 4 is a sequence diagram illustrating a procedure of authentication processing according to the first embodiment of the invention.

First, a procedure to login to the image forming apparatus 10 is described. When a user sets his or her card 50 at the card reader 40, the card ID acquisition unit 111 of the authentication client application 11 acquires the card ID from the card reader 40 (hereinafter called a "current card ID") to record the current card ID in the memory 102 (step S101). Note that setting the card 50 at the card reader 40 indicates that the card reader 40 is ready to read information recorded on the card 50. The card reader 40 being ready to read information recorded on the card 50 indicates a state in which the user inserts the card 50 into the card reader 40 or a state in which the user holds the card 50 over the card reader 40. Subsequently, the authentication request unit 112 of the authentication client application 11 sends an authentication request including the current card ID to the authentication proxy application 12 (step S102). Note that the authentication request is received by the first authentication request reception unit 121 of the authentication proxy application 12.

Subsequently, the authentication control unit 122 of the authentication proxy application 12 determines whether the authentication server 20 related to identification information registered in the access destination management unit 124 is available based on the identification information registered in the access destination management unit 124 (step S103). For example, the authentication control unit 122 of the authentication proxy application 12 determines whether communication can be established with the authentications server 20. Based on the obtained result, communication failure in the network between the authentication server 20 and the image forming apparatus 10 or failure in the authentication server 20 (e.g., authentication server 20 is not in a startup status) may be detected. Note that determining whether the communication can be established may be carried out by well-known technologies such as issuing the "ping" command.

If the authentication server 20 is available, the authentication control unit 122 of the authentication proxy application 12 sends the authentication request including the current card ID to the authentication server 20 (step S 104). Note that the authentication request is received by the second authentication request reception unit 221 of the authentication server application 21.

Subsequently, the authentication processing unit 222 of the authentication server application 21 acquires the user information corresponding to the current ID from the user information management unit 223 (step S105).

FIG. 5 is a diagram illustrating an example of a user information configuration in the user information management unit 223. As illustrated in FIG. 5, the user information management unit 223 includes the user information registered based on each user. The user information includes usernames, passwords, card IDs, and authorization information. A user name is a unique identifier assigned to each user. A password is assigned corresponding to each user. A card ID is recorded in the card 50 distributed to each user. A mail address is the user's email address. Authorization information includes information on different authorized functions available to each user.

In step 105, the authentication processing unit 222 acquires a record (i.e., user information) containing a value of the card ID that matches the current card ID from those stored in the user information management unit 223. The acquired user information is hereinafter called "current user information". Subsequently, the authentication processing unit 222 executes authentication processing based on the user name and the corresponding password contained in the current user information as authentication information. Note that the authentication processing may not be executed based on the user name and the corresponding password. Further, the authentication processing may not be executed in the authentication server 20. For example, as illustrated in FIG. 4, the authentication processing unit 222 of the authentication server application 21 sends the user name to the LDAP server 60 in order to inquire about an entry corresponding to the user name for the LDAP server 60 (step S106). When the LDAP server 60 sends a response to the inquiry reporting the existence of the entry corresponding to the user name, the authentication processing unit 222 of the authentication server application 21 determines that the authentication has succeeded, and then sends a response including information indicating that the authentication has succeeded to the authentication proxy application 12 (step S107). Note that the response includes the current user information. If the authentication has failed, the authentication processing unit 222 of the authentication server application 21 sends a response including information indicating that the authentication has failed to the authentication proxy application 12. In this case, the response does not include the current user information. The authentication control unit 122 of the authentication proxy application 12 thus determines whether the authentication has succeeded or failed based on the response from the authentication server application 21.

If the authentication has succeeded, the user information recording unit 123 of the authentication proxy application 12 records the current user information contained in the reply into the user information cache unit 125 (step S108).

FIG. 6 is a diagram illustrating an example of the user information cache unit configuration 125. As illustrated in FIG. 6, the user information cache unit 125 has a configuration similar to the user information management unit 223. However, the user information cache unit 125 differs from the user information management unit 223 in the following manner. Whereas the user information management unit 223 registers the user information of all the users in advance, the user information cache unit 125 registers only the user information of the users who have succeeded in the authentication. Accordingly, the utilized capacity of the auxiliary storage device 103 may be significantly low in comparison to the case where the user information of all the users is registered. FIG. 6 illustrates a case where the user information of a user having a user name of "AAA" is registered in the user information cache unit 125.

Subsequently, the authentication control unit 122 sends a response including the current user information and information indicating that the authentication has succeeded to the authentication client application 11 (step S109). In response to the successful authentication, the authentication request unit 112 of the authentication client application 11 authorizes the user to have access to functions of the image forming apparatus 10 via the display unit 108 and the operations unit 109 (step S110). Note that the current user information may, for example, be used for identifying a login user in recording log information or charging information. Moreover, the current user information may be used in determining whether to authorize user of functions of the image forming apparatus 10.

In the following, a process is described in which the user logs out once and then logs into the image forming apparatus 10 again. Note that steps S121 through S123 are similar to steps S101 through S103. However, in step S123, it is assumed that the authentication control unit 122 of the authentication proxy application 12 has determined that the authentication server 20 registered in the access destination management unit 124 is not available. That is, network failure or failure of the authentication server 20 itself may have occurred.

In this case, the authentication control unit 122 of the authentication proxy application 12 authenticates the user based on the current card ID (i.e., card ID acquired in step S121) and the current user information recorded in the user information cache unit 125. Specifically, the authentication control unit 122 searches for the user information corresponding to the current card ID in the user information cache unit 125 (step S124). If the user information corresponding to the current card ID is found in the user information cache unit 125 (i.e., the user information has been registered in the user information cache unit 125), the authentication control unit 122 determines that the authentication of the user has succeeded. If the user information corresponding to the current card ID is not found in the user information cache unit 125 (i.e., the user information has not been registered in the user information cache unit 125), the authentication control unit 122 determines that the authentication of the user has failed.

Note that step S125 and those subsequent to step S125 are similar to step S109 and those subsequent to step S109. That is, if the authentication has succeeded, the authentication control unit 122 sends to the authentication client application 11 a response including the user information acquired from the user information cache unit 125 and information indicating that the authentication has succeeded (step S125). In contrast, if the authentication has failed, the authentication control unit 122 sends to the authentication client application 11 a response including information indicating that the authentication has failed.

According to the first embodiment, the user can log into the image forming apparatus 10 that the user has used once even if the authentication server 20 is not available. Accordingly, the user can use the image forming apparatus 10 with stability regardless of availability of the authentication server 20. As a result, it is possible to reduce the possibilities of interrupting users work duties due to unavailability of the authentication server 20.

Moreover, since the user information is registered in the user information cache unit 125 when the user has succeeded at his or her authentication, the utilized capacity of the storage region by the user information cache unit 125 may be appropriately prevented from increasing. However, if numerous users use the image forming apparatus 10, the user information recording unit 123 may be configured to delete the user information of less frequent users from the user information cache unit 125.

Further, the user information (particularly passwords) in the authentication server 20 may be periodically changed for security reasons. In such cases, the user information recording unit 123 may be configured to periodically download the user information recorded in the user information cache unit 125 from the authentications server 20. With this configuration, it is possible to reduce possibilities of generating inconsistencies between the user information in the user information cache unit 125 and the user information in the user information management unit 223 of the authentication server 20. Further, since only the user information registered in the user information cache unit 125 is allowed to be downloaded, the utilized the capacity of the storage region or network load may be reduced compared to the case where user information of all the users is downloaded.

Note that the access destination management unit 124 may register plural authentication servers 20. In such a case, the authentication control unit 122 of the authentication proxy application 12 determines whether the authentication servers 20 are available in the order of authentication servers 20 registered in the access destination management unit 124, and sends an authentication request to the authentication servers 20 that are found to be available. Accordingly, if an authentication server 20a is not available, but an authentication server 20b is available, the authentication processing may be executed via the authentication server 20b. This increases the availability of the authentication servers 20. Note that if no authentication servers 20 registered in the access destination management unit 124 are available, the authentication control unit 122 executes the authentication processing via the user information cache unit 125.

Note that in the first embodiment, if the authentication server 20 is not available and the user has never logged into the image forming apparatus 10 in question in the past, the user is unable to log into that image forming apparatus 10. A second embodiment of the invention provided to overcome the drawback is described below.

Figure 7:
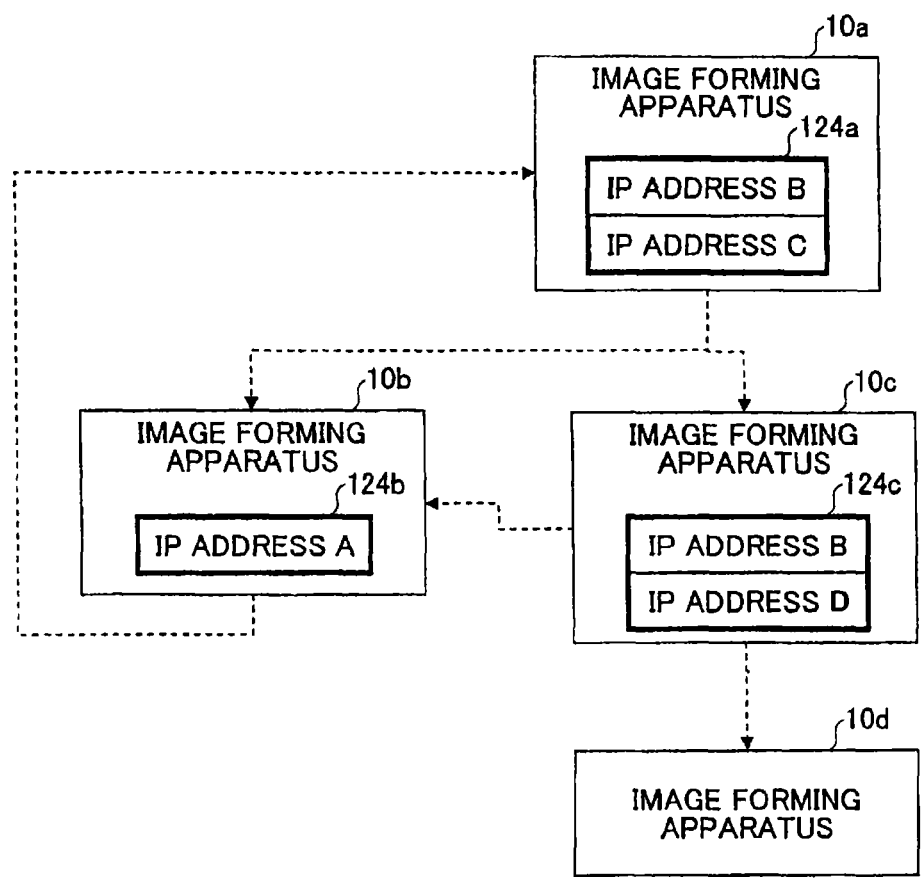
FIG. 7 is a diagram illustrating settings of access destination management units of the image forming apparatuses according to a second embodiment.

According to the second embodiment of the invention, the access destination management unit 124 may register other image forming apparatuses in addition to those registered in the authentication servers 20. FIG. 7 is a diagram illustrating settings of access destination management units 124a and the like of the image forming apparatuses 10a through 10d according to the second embodiment of the invention.

As illustrated in FIG. 7, the access destination management unit 124a of the image forming apparatus 10a registers IP addresses B and C. The IP address B is an IP address of the image forming apparatus 1ob and the IP address C is an IP address of the image forming apparatus 10c. Thus, the image forming apparatus 10a is capable of transferring an authentication request to the image forming apparatus 10b or 10c. In such a case, there are referring relationships between the image forming apparatuses 10b and 10c and the image forming apparatus 10a. In the referring relationships, the image forming apparatus 10a is one that refers to the IP addresses of the image forming apparatuses 10b and 10c, and the image forming apparatuses 10b and 10c are those the IP addresses of which are referred to by the image forming apparatus 10a. Note that dashed arrows in FIG. 7 illustrate the referring relationships between the image forming apparatuses 10b and 10c and the image forming apparatus 10a.

The access destination management unit 124b of the image forming apparatus 10b registers an IP address A. The IP address A is an IP address of the image forming apparatus 10a. That is, the image forming apparatus 10b refers to the image forming apparatus 10a. As illustrated in FIG. 7, the access destination management unit 124c of the image forming apparatus 10c registers IP addresses B and D. The IP address D is an IP address of the image forming apparatus 10d. That is, the image forming apparatus 10c refers to the image forming apparatuses 10b and 10d.

Note that each of the access destination management units 124a through 124d of the image forming apparatuses 10a through 10d registers at least one IP address of a corresponding one of the authentication servers 20; however, some of the IP addresses are not illustrated in FIG. 7. In the following description, the image forming apparatus 10 illustrated in FIG. 3 corresponds to the image forming apparatuses 10a through 10d in FIG. 7, and elements of the image forming apparatused 10a through 10d corresponding to those of the image forming apparatus 10 are illustrated by assigning a letter a, b, c, or d to ends of the reference numerals given to the elements of the corresponding image forming apparatuses 10.

Figure 8A:
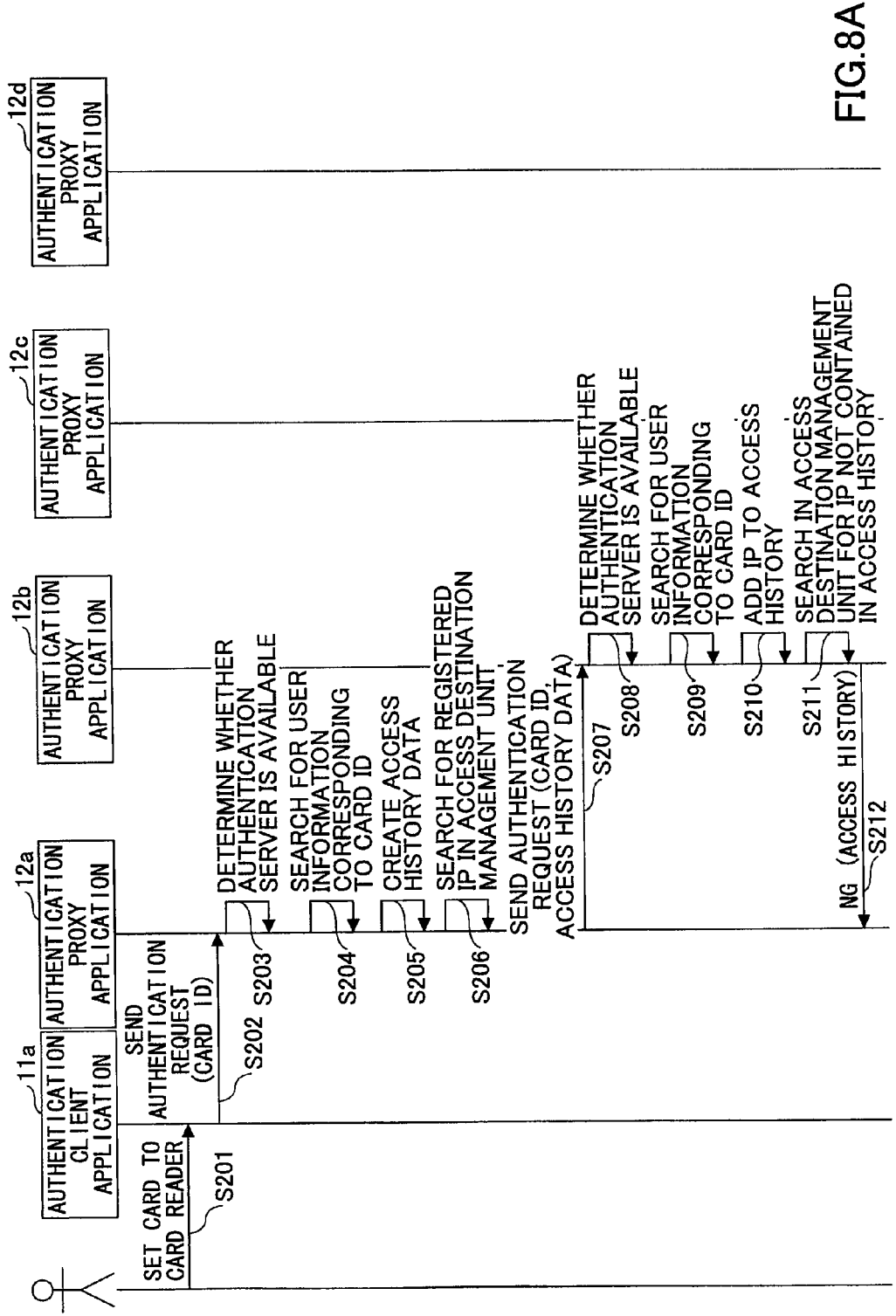

FIGS. 8A and 8B are each another sequence diagram illustrating a procedure of authentication processing according to the second embodiment of the invention. In FIGS. 8A and 8B, it is assumed that the user is operating the image forming apparatus 10a.

Note that steps S201 through S203 in FIG. 8A are similar to steps S121 through S123 in FIG. 4. In this case, the authentication servers 20 registered in the access destination management unit 124a are not available.

Accordingly, the authentication control unit 122a of the authentication proxy application 12a searches for the user information corresponding to the current card ID in the user information cache unit 125a (step S204). In this step, it is assumed that the user information corresponding to the current card ID is not found. Thus, the authentication control unit 122a determines that the authentication has failed. When the authentication has failed, the authentication control unit 122a executes authentication processing based on one of the user information sets registered in the other user information cache units 125b to 125d of the corresponding image forming apparatuses 10b to 10d.

First, the authentication control unit 122a creates access history data in the memory 102 and records an IP address (IP address A) of the image forming apparatus 10a in the access history data (step S205). The access history data include data having identification information (IP address in the second embodiment) of the image forming apparatus 10 that has carried out authentication of the user via the user information cache unit 125. The usage of the access history data is described later.

Next, the authentication control unit 122a acquires IP addresses of the image forming apparatuses 10 registered in the access destination management unit 124a (step S206). In this step, the authentication control unit 122a acquires IP addresses B and C as illustrated in FIG. 7. Note that the access destination management unit 124 registers the IP address of the image forming apparatus 10 such that the IP address of the image forming apparatus 10 can be identified from the IP address of the authentication server 20. For example, the IP address of the image forming apparatus 10 may be recorded in a different region (file) from the region including the IP address of the authentication server 20. Or IP addresses of the authentication servers 20 and the image forming apparatus 10 may be provided with respective identifiers for identifying which one of he authentication servers 20 and the image forming apparatus 10 includes the IP address in question. Further, the authentication server 20 and the image forming apparatus 10 can be identified by the IP addresses themselves.

Subsequently, the authentication control unit 122a sends an authentication request including the current card ID and the access history data to the IP address B (i.e., image forming apparatus 10b) that is registered in the highest order of the IP addresses acquired from the access destination management unit 124a (step S207). Note that the authentication request is received by the first authentication request reception unit 121b of the proxy authentication application 12b in the image forming apparatus 10b.

Next, the authentication control unit 122b of the authentication proxy application 12b determines whether the authentication server 20 is available (step S208). If the authentication server 20 is not available, the authentication control unit 122a searches in the user information cache unit 125b for the user information corresponding to the current card ID contained in the authentication request (step S209). If the user information corresponding to the current card ID is not found, the authentication control unit 122b of the authentication proxy application 12b adds the IP address (i.e., IP address B) of the image forming apparatus 10b to the access history data contained in the authentication request (step S210). Accordingly, the access history data include IP addresses A and B registered therein at this moment. Next, the authentication control unit 122b acquires an IP address that is not contained in the access history data from those of the image forming apparatuses 10 registered in the access destination management unit 124b (step S211). As illustrated in FIG. 7, the access destination management unit 124b of the image forming apparatus 10b registers the IP address A. However, the access history data already contain the IP address A. Since there is no IP address that is not contained in the access history data in this case, the authentication control unit 122b acquires no IP address. The authentication control unit 122b sends a response including information indicating that the authentication has failed to the authentication proxy application 12a (step S212). Note that the response sent by the authentication control unit 122b includes the IP addresses A and B, and the access history data.

In this manner, the access history data may be used in order to prevent the image forming apparatus 10 from duplicating the authentication processing. The access history data may not only be used for preventing redundant authentication processing but also used for preventing infinite loop generation of the authentication processing. Specifically, as illustrated in FIG. 7, there is a loop forming the referring relationship between the image forming apparatuses 10a and 10b. However, this loop forming the referring relationship may be appropriately removed due to the existence of the access history data.

Subsequently, in response to the information on the authentication failure by the image forming apparatus 10b, the authentication control unit 122a of the authentication proxy application 12a sends an authentication request including the current card ID and the access history data to the IP address C (i.e., image forming apparatus 10c) registered next to the IP address B in the access destination management unit 124 (step S213 in FIG. 8B). Note that the authentication request is received by the first authentication request reception unit 121c of the proxy authentication application 12c in the image forming apparatus 10c.

Next, the authentication control unit 122c of the authentication proxy application 12c determines whether the authentication server 20 is available (step S214). If the authentication server 20 is not available, the authentication control unit 122c searches in the user information cache unit 125c for the user information corresponding to the current card ID contained in the authentication request (step S215). If the user information corresponding to the current card ID is not found, the authentication control unit 122c of the authentication proxy application 12c adds the IP address (i.e., IP address C) of the image forming apparatus 10c to the access history data contained in the authentication request (step S216). Accordingly, the access history data include IP addresses A, B and C registered therein at this moment. Next, the authentication control unit 122c selects an IP address that is not contained in the access history data from those of the image forming apparatuses 10 registered in the access destination management unit 124c (step S217). As illustrated in FIG. 7, the access destination management unit 124c of the image forming apparatus 10c registers IP addresses B and D. However, the access history data already contain the IP address B. Thus, the IP address that is not contained in the access history data but is registered in the access destination management unit 124c is the IP address D. The authentication control unit 122c acquires the IP address D in this case.

The authentication control unit 122c of the authentication proxy application 12c sends an authentication request including the current card ID and the access history data to the IP address D (i.e., image forming apparatus 10d) (step S218). Note that the authentication request is received by the first authentication request reception unit 121d of the proxy authentication application 12d in the image forming apparatus 10d.

Next, the authentication control unit 122d of the authentication proxy application 12d determines whether the authentication server 20 is available (step S219). If the authentication server 20 is not available, the authentication control unit 122d searches in the user information cache unit 125d for the user information corresponding to the current card ID contained in the authentication request (step S220). If the user information corresponding to the current card ID is found in the user information cache unit 125d, the authentication control unit 122d determines that the authentication of the user has succeeded. If the authentication has succeeded, the authentication control unit 122d sends to the authentication proxy application 12c a response including the user information acquired from the user information cache unit 125d and information indicating that the authentication has succeeded (step S221). If the response received from the authentication proxy application 12d includes the information indicating that the authentication has succeeded, the authentication control unit 122c sends the received response to the authentication proxy application 12a (step S222). If the response received from the authentication proxy application 12c includes the information indicating that the authentication has succeeded, the authentication control unit 122a of the authentication proxy application 12a sends the received response to the authentication client application 11a (step S223). In response to the successful authentication, the authentication request unit 112a of the authentication client application 11a authorizes the user to have access to predetermined functions of the image forming apparatus 10a via the display unit 108 and the operations unit 109 (step S224).

According to the second embodiment of the invention, in a case where the authentication server 20 is not available and also in a case where the authentication processing (based on the user information cache unit 125) has failed in the image forming apparatus 10, the image forming apparatus 10 can assign other image forming apparatuses 10 to authenticate users. For example, if a login history of the card ID that a user holds is not recorded in the image forming apparatus 10a but has been recorded in the image forming apparatus 10d, the user can still be authenticated based on the card ID recorded in the user information cache unit 125d of the image forming apparatus 10d to thereby be authorized to have access to the image forming apparatus 10a.

Note that each of the authentication control units 122 of the image forming apparatuses 10 may carry out authentication processing by referring to the user information registered in the user information cache units 125 of the other image forming apparatuses 10 instead of sending the authentication request to the other image forming apparatuses 10 registered in its own access destination management unit 124. Specifically, the authentication control unit 122 may, for example, download the user information registered in the other user information cache units 125 of the other image forming apparatuses 10, and authenticates the user (card ID) based on whether the downloaded user information includes target user information including the current card ID in question. This modification of the second embodiment may also demonstrate the authentication processing carried out based on the user information registered in the other user information cache units 125 of the other image forming apparatuses 10.

Further, in the above embodiments, the authentication information input by the user is the card ID, and the authentication server 20 recognizes the user name and the password specified by the card ID as the authentication information. However, the authentication information input by the user is not limited to the card ID. For example, users may directly input the user name and the password as the authentication information. In this case, the user information cache unit 125 may be configured to record the user name and the password. Likewise, other authentication systems, such as biometrics may be applied to the embodiments of the invention in place of the authentication system based on the user names and the passwords described in the above embodiments.

According to the embodiments of the invention, even if an authentication apparatus connected to the image forming apparatus via the network is not available, authentication of users can be appropriately carried out.

It should be noted that although the present invention is described above with respect to certain preferred embodiments, the present invention is not limited to these specifically disclosed embodiments, and variations and modifications may be made without departing from the scope of the present invention.

The present application is based on Japanese Patent Application No. 2009-126867 filed on May 26, 2009, with the Japanese Patent Office, the entire contents of which are hereby incorporated herein by reference.

What is claimed is:

1. An image forming apparatus comprising:
circuitry configured to:
connect via a network to an authentication apparatus and to at least one other image forming apparatus;
register the authentication apparatus and at least one of the at least one connected other image forming apparatus;
store user information of an authenticated user of the image forming apparatus;
send a first authentication request and an authentication target information to the registered authentication apparatus in response to acquiring the authentication target information;
execute user authentication at the image forming apparatus of the authentication target information based on the stored user information of the authenticated user of the image forming apparatus when the authentication apparatus is not available to carry out the user authentication in response to the first authentication request;
send a second authentication request and the authentication target information to one of the at least one registered other image forming apparatus when the authentication apparatus is not available to carry out the user authentication in response to the first authentication request and the user authentication at the image forming apparatus of the authentication target information based on the stored user information of the authenticated user of the image forming apparatus has failed, the one of the at least one registered other image forming apparatus storing user information of an authenticated user of the one of the at least one registered other image forming apparatus; and
create an access history data identifying the image forming apparatus when the image forming apparatus does not authenticate the user at the image forming apparatus,
wherein send the second authentication request and the authentication target information to the one of the at least one registered other image forming apparatus includes sending the second authentication request, the authentication target information, and the access history data to the one of the at least one registered other image forming apparatus, and
wherein the image forming apparatus and the at least one other image forming apparatus are the same type of image forming apparatus.

2. The image forming apparatus as claimed in claim 1, wherein the circuitry is further configured to:
receive the second authentication request and the authentication target information from one of the at least one other image forming apparatus via the network, and
execute the user authentication at the image forming apparatus of the authentication target information based on the stored user information of the authenticated user of the image forming apparatus when receiving the second authentication request and the authentication target information.

3. The image forming apparatus as claimed in claim 1, wherein
the circuitry is further configured to:
receive authentication target information and access history data created by one of the at least one connected other image forming apparatus, and
send the second authentication request and the authentication target information to the one of the at least one registered other image forming apparatus includes sending the second authentication request, the authentication target information, and the access history data to one of the at least one registered other image forming apparatus other than the one of the at least one connected other image forming apparatus that created the received access history data.

4. The image forming apparatus as claimed in claim 2, wherein
the circuitry is further configured to:
create an access history data identifying the image forming apparatus not authenticating the user at the image forming apparatus, and
send the second authentication request and the authentication target information to the one of the at least one registered other image forming apparatus includes sending the second authentication request, the authentication target information, and the access history data to one of the at least one registered other image forming apparatus.

5. The image forming apparatus as claimed in claim 4, wherein
the circuitry is further configured to:
receive authentication target information and access history data created by one of the at least one connected other image forming apparatus, and send the second authentication request and the authentication target information to the one of the at least one registered other image forming apparatus includes sending the second authentication request, the authentication target information, and the access history data to one of the at least one registered other image forming apparatus other than one of the at least one connected other image forming apparatus in the received access history data.

6. A method comprising:
connecting via a network an image forming apparatus to an authentication apparatus and to at least one other image forming apparatus;
registering, in a registry unit of the image forming apparatus, the authentication apparatus and at least one of the at least one connected other image forming apparatus;
storing, in a storing unit of the image forming apparatus, user information of an authenticated user of the image forming apparatus;
sending a first authentication request and an authentication target information to the registered authentication apparatus in response to acquiring the authentication target information;
executing user authentication at the image forming apparatus of the authentication target information based on the stored user information of the authenticated user of the image forming apparatus when the authentication apparatus is not available to carry out the user authentication in response to the first authentication request;
sending a second authentication request and the authentication target information to one of the at least one registered other image forming apparatus when the authentication apparatus is not available to carry out the user authentication in response to the first authentication request and the user authentication at the image forming apparatus of the authentication target information based on the stored user information of the authenticated user of the image forming apparatus has failed, the one of the at least one registered other image forming apparatus storing user information of an authenticated user of the one of the at least one registered other image forming apparatus; and
creating an access history data identifying the image forming apparatus when the image forming apparatus does not authenticate the user at the image forming apparatus,
wherein the sending the second authentication request and the authentication target information to the one of the at least one registered other image forming apparatus includes sending the second authentication request, the authentication target information, and the access history data to the one of the at least one registered other image forming apparatus, and
wherein the image forming apparatus and the at least one other image forming apparatus are the same type of image forming apparatus.

7. The method as claimed in claim 6, further comprising:
receiving the second authentication request and the authentication target information from one of the at least one other image forming apparatus via the network; and
executing the user authentication at the image forming apparatus of the authentication target information based on the stored user information of the authenticated user of the image forming apparatus when receiving the second authentication request and the authentication target information.

8. The method as claimed in claim 6, further comprising:
receiving authentication target information and access history data created by one of the at least one connected other image forming apparatus, wherein
the sending the second authentication request and the authentication target information to the one of the at least one registered other image forming apparatus includes sending the second authentication request, the authentication target information, and the access history data to one of the at least one registered other image forming apparatus other than the one of the at least one connected other image forming apparatus that created the received access history data.

9. The method as claimed in claim 7, further comprising:
creating an access history data identifying the image forming apparatus not authenticating the user by the executing at the image forming apparatus, wherein
the sending the second authentication request and the authentication target information to the one of the at least one registered other image forming apparatus includes sending the second authentication request, the authentication target information, and the access history data to one of the at least one registered other image forming apparatus.

10. The method as claimed in claim 9, wherein
the receiving includes receiving authentication target information and access history data created by one of the at least one connected other image forming apparatus, and
the sending the second authentication request and the authentication target information to the one of the at least one registered other image forming apparatus includes sending the second authentication request, the authentication target information, and the access history data to one of the at least one registered other image forming apparatus other than the one of the at least one connected other image forming apparatus that created the received access history data.

11. An authentication system including an authentication apparatus and a plurality of image forming apparatuses being communicable via a network, the authentication system comprising:
registering circuitry, of at least one of the image forming apparatuses, configured to register another image forming apparatus of the plurality of image forming apparatuses;
receiving circuitry, of at least one of the image forming apparatuses, configured to receive an input authentication target information;
storing circuitry, of at least one of the image forming apparatuses, configured to store user information of an authenticated user of at least one of the image forming apparatuses;
first sending circuitry, of at least one of the image forming apparatuses, configured to send a first authentication request including the authentication target information to the authentication apparatus in response to receiving the authentication target information;
authentication circuitry, of at least one of the image forming apparatuses, configured to execute user authentication of the authentication target information based on the stored user information of the authenticated user of the at least one of the image forming apparatuses when the authentication apparatus is not available to carry out the user authentication in response to the first authentication request;

second sending circuitry, of at least one of the image forming apparatuses, configured to send a second authentication request including the authentication target information to one registered image forming apparatus when the authentication apparatus is not available to carry out the user authentication in response to the first authentication request and the user authentication at the at least one image forming apparatus of the authentication target information based on the stored user information of the authenticated user of the at least one of the apparatuses has failed; and data creating circuitry, of at least one of the image forming apparatuses, configured to create an access history data identifying the at least one of the image forming apparatuses when the at least one of the image forming apparatuses does not authenticate the user at the at least one of the image forming apparatuses, wherein the second sending circuity is further configured to send the second authentication request, the authentication target information, and the access history data to the one registered image forming apparatus, and wherein the plurality of image forming apparatuses are the same type of image forming apparatus.

12. The apparatus as claimed in claim 1, wherein the authentication apparatus is configured to receive authentication requests from the image forming apparatus and from the at least one other image forming apparatus via the network.

13. The method as claimed in claim 6, wherein the authentication apparatus receives authentication requests from the image forming apparatus and from the at least one other image forming apparatus via the network.

14. The authentication system as claimed in claim 11, wherein the authentication apparatus receives authentication requests from the at least one of the image forming apparatuses and the another image forming apparatus via the network.

* * * * *